Jan. 24, 1928.
W. L. MARRIAN
INK BOTTLE OR CONTAINER
Filed Feb. 24, 1927
1,657,168
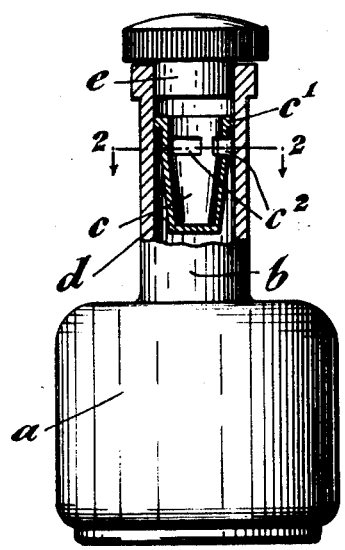
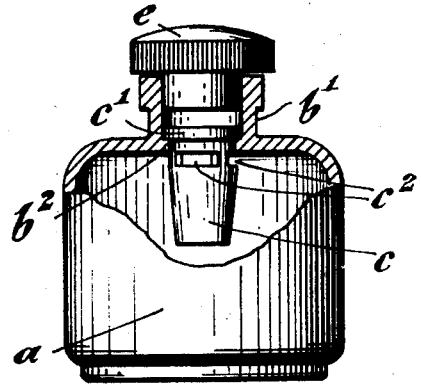
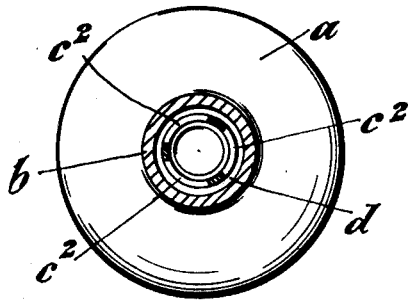
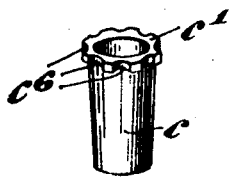
INVENTOR:-
W. L. MARRIAN.
BY George E. Folkes
ATTORNEY.

Patented Jan. 24, 1928.

1,657,168

UNITED STATES PATENT OFFICE.

WILLIAM LYON MARRIAN, OF BIRMINGHAM, ENGLAND.

INK BOTTLE OR CONTAINER.

Application filed February 24, 1927, Serial No. 170,614, and in Great Britain March 24, 1926.

This invention relates to ink bottles or containers of the type which comprises in combination with the main chamber a smaller supplementary trap chamber associated with the neck and stopper of the bottle so as to provide a removable internal dipping well which is filled when the bottle is first tilted and then returned to normal position.

According to the present invention there is provided an ink bottle or container, of the type referred to, comprising a body enclosing a main chamber, a stoppered cylindrical neck upstanding therefrom, a trap chamber disposed within or beneath said neck, an external annular flange on the upper end of the trap chamber, slidably fitted within said neck, and lateral ink ports and air ports disposed in circumferentially spaced relation in the said trap chamber.

In order that this invention may be clearly understood and readily carried into practice, reference may be had to the appended explanatory sheet of drawings upon which:—

Figure 1 is a partly sectional elevation of an ink bottle or container having the present invention applied.

Figure 2 is a plan of Figure 1, in section on the line 2—2.

Figure 3 is a partly sectional elevation of an ink bottle or container having the invention applied in a slightly modified form.

Figure 4 is an elevation in perspective of the ink trap chamber shown in Figures 1 to 3.

Figure 5 is a sectional elevation of a modified form of ink trap chamber.

Figure 6 is an elevation in perspective of a still further modified form of ink trap chamber.

In carrying the invention into effect, the ink bottle or container $a$ may be of any ordinary or suitable form, either with an elongated neck $b$ (Figure 1) or with an ordinary neck $b^1$ (Figure 3). Within or beneath the neck or mouth of the bottle or container is provided a trap chamber $c$ of relatively small capacity, this trap chamber $c$ being closed at the bottom and open at the top, and being separately and removably fitted therein as shown for instance in Figures 1 and 3.

The separately fitted trap chamber $c$ may be made in glass or earthenware, corresponding to the material of the bottle or container $a$, or it may alternatively be made in metal, or in rubber, vulcanite, or other suitable material. In either case the separate trap chamber $c$ is closed at the bottom and open at the top, and is retained in position within or beneath the neck or mouth of the bottle or container, by a cylindrical or slightly tapered annular upper rim $c^1$ engageable frictionally within the wall of the neck or mouth $b$, as shown in Figure 1, or bearing upon an annular shoulder $b^2$ provided within the neck or mouth as shown in Figure 3. The necessary passage $d$ for the ink is provided by reducing the external diameter of the intermediate and lower parts of the trap chamber $c$, and by providing lateral openings $c^2$ through the wall of this reduced part, in a position towards the top, for example immediately beneath the annular upper rim $c^1$ as shown in Figures 1 to 5, or by providing equivalent peripheral openings $c^6$ in said rim $c^1$ as shown in Figure 6. This reduced part of the trap chamber $c$ is preferably of cylindrical or slightly tapering form as shown, but it may be of any other convenient form. In a further modification (Figure 5) the separately fitted trap chamber $c$ may be formed with a downwardly tapering annular shoulder $c^5$ beneath the rim $c^1$, this shoulder $c^5$ converging towards the interior of the trap chamber to provide an additional means of ensuring the filling of the trap.

The method of using the device is as follows:—

The usual stopper $e$ is first inserted, and in the case of a full supply of ink the bottle or container $a$ is tilted sideways, causing ink to flow into and fill the neck $b$ or $b^1$ and trap chamber $c$ so as to displace the air therein, and when the bottle is returned to its upright position the necessary small quantity of this ink is positively retained within the trap chamber $c$, up to the level of the openings therein. In case the main supply of ink has been considerably reduced the bottle or container *a* is inverted, causing ink to flow into the space between the trap chamber *c* and the stopper *e* (which space is preferably at least equal to the capacity of the trap chamber), and when the bottle is returned to its upright position the necessary small quantity of this ink is diverted into and positively retained within the trap chamber *c*, up to the level of the openings therein.

It will be seen therefore that the trap chamber *c* is adapted to serve as an auxiliary inkwell, or as a reliable, clean, and advantageous means of filling a fountain pen. The trap chamber *c* may be refilled as required from the bulk of ink in the bottle or container *a*, and is of such a form that the entire supply of ink may be utilized without any liability to waste or leakage, no matter what may be the shape and size of the bottle or container. It will further be seen that the openings or passages governing the filling of the trap chamber *c* also permit of the bottle or container being filled in the ordinary manner, and that ink may be poured out of the bottle or container quite freely.

What I claim as my invention and desire to secure by Letters Patent is:—

1. An ink bottle or container which comprises, in combination, a body, a main storage chamber within said body, a stoppered cylindrical neck upstanding from said body, a removable trap chamber disposed within said neck, an external annular flange on the upper end of said trap chamber, slidably fitted within said neck, and lateral ink ports and air ports disposed in circumferentially spaced relation in said trap chamber, the trap chamber being adapted to constitute a removable internal dipping well which is filled when the bottle or container is first tilted and then returned to normal position.

2. An ink bottle or container which comprises, in combination, a body, a main storage chamber within said body, a stoppered cyclindrical neck upstanding from said body, an internal annular shoulder at the lower end of said neck, a removable trap chamber disposed within said neck, an external annular flange on the upper end of said trap chamber, slidably fitted within said neck so as to bear upon said shoulder, and lateral ink ports and air ports disposed in circumferentially spaced relation in said chamber, the trap chamber being adapted to constitute a removable internal dipping well which is filled when the bottle or container is first tilted and then returned to normal position.

3. An ink bottle or container which comprises, in combination, a body, a main storage chamber within said body, a stoppered cylindrical neck upstanding from said body, a removable trap chamber disposed within said neck, an external flange on the upper end of said trap chamber, slidably fitted within said neck, and circumferentially spaced slotted openings constituting lateral ink ports and air ports on the upper part of the wall of said trap chamber, the trap chamber being adapted to constitute a removable internal dipping well which is filled when the bottle or container is first tilted and then returned to normal position.

4. An ink bottle or container which comprises, in combination, a body, a main storage chamber within said body, a stoppered cylindrical neck upstanding from said body, an internal annular shoulder at the lower end of said neck, a removable trap chamber disposed within said neck, an external annular flange on the upper end of said trap chamber, slidably fitted within said neck so as to bear upon said shoulder, and circumferentially spaced slotted openings constituting lateral ink ports and air ports in the upper part of the wall of said trap chamber, the trap chamber being adapted to constitute a removable internal dipping well which is filled when the bottle or container is first tilted and then returned to normal position.

5. An ink bottle or container which comprises, in combination, a body, a main storage chamber within said body, a stoppered cylindrical neck upstanding from said body, a removable trap chamber disposed within said neck, an external annular flange on the upper end of said trap chamber, slidably fitted within said neck, and circumferentially spaced ink ports and air ports provided by peripheral openings in the flange of said trap chamber, the trap chamber being adapted to constitute a removable internal dipping well which is filled when the bottle or container is first tilted and then returned to normal position.

6. An ink bottle or container which comprises, in combination, a body, a main storage chamber within said body, a stoppered cylindrical neck upstanding from said body, a removable trap chamber disposed within said neck, an external annular flange on the upper end of said trap chamber, slidably fitted within said neck, a downwardly tapering annular shoulder converging from said flange towards the interior of said trap chamber, and lateral ink ports and air ports disposed in circumferentially spaced relation in said trap chamber, the trap chamber being adapted to constitute a removable internal dipping well which is filled when the bottle or container is first tilted and then returned to normal position.

7. An ink bottle or container which comprises, in combination, a body, a main storage chamber within said body, a stoppered cylindrical neck upstanding from said body, an internal annular shoulder at the lower end of said neck, a removable trap chamber disposed within said neck, an external annular flange on the upper end of said trap chamber, slidably fitted within said neck so as to bear upon said shoulder, a downwardly tapering annular shoulder converging from said flange towards the interior of said trap chamber, and lateral ink ports and air ports disposed in circumferentially spaced relation in said trap chamber, the trap chamber being adapted to constitute a removable internal dipping well which is filled when the bottle or container is first tilted and then returned to normal position.

In witness whereof I have hereunto set my hand.

WILLIAM LYON MARRIAN.